(No Model.)

P. P. CUPLIN.
GRAND STAND.

No. 491,087. Patented Feb. 7, 1893.

UNITED STATES PATENT OFFICE.

PASCAL P. CUPLIN, OF WEST BEND, IOWA.

GRAND STAND.

SPECIFICATION forming part of Letters Patent No. 491,087, dated February 7, 1893.

Application filed December 18, 1891. Serial No. 415,501. (No model.)

*To all whom it may concern:*

Be it known that I, PASCAL P. CUPLIN, of West Bend, in the county of Palo Alto and State of Iowa, have invented a new and Improved Grand Stand, of which the following is a full, clear, and exact description.

My invention relates to improvements in grand-stands, and more especially to grand-stands which are adapted for use in connection with race tracks to enable people to witness a race.

It is well known that grand-stands as usually constructed, are erected opposite the home-stretch of a race track and at one side of the track, usually the outer side, and consequently for quite a portion of the race the horses can be but indistinctly seen, if seen at all, and the interest in the race during this interval is lost.

The object of my invention is to produce a grand-stand which may be revolved so that people on the stand may be in a position to easily witness the race, and by constructing and arranging the stand in this manner it may be placed inside the track, so that the spectators will be at all times a comparatively short distance from the horses and may look directly upon them. This grand-stand may be used in connection with the regulation track, and it is especially valuable in connection with what is known as the kite-shaped track, as the grand-stand may be, in the latter case, arranged between the converging sides or straightaway portions of the track, and the spectators may thus be in close proximity to the said parts of the track, so that the start and finish of the race may be witnessed to perfection.

To this end my invention consists in an improved grand-stand, the construction and arrangement of which will be hereinafter described and claimed.

Reference is to be had to the accompanying drawings forming a part of this specification, in which similar figures of reference indicate corresponding parts in all the views.

Figure 1 is a vertical cross section of a stand embodying my invention; Fig. 2 is a cross section on the line 2—2 in Fig. 3, showing the base of the stand and a modified means of supporting and revolving it; and Fig. 3 is a broken plan view of the apparatus shown in Fig. 2.

The grand stand 10, is provided with a basin-like base 11, which has on its outer circumference near the bottom, a series of gear teeth $11^a$, and on the base are supported in tiers in the usual manner, the seats 12, which are covered by suitable roof 13, which is supported on uprights 14. The grand stand itself may be of any approved construction however, as its detailed construction forms no part of this invention. The basin-like base 11 may be held to float in a reservoir of water $14^a$, and to hold the grand stand in place it is mounted to revolve on the central post 15, as shown by dotted lines in Fig. 1. The grand stand may be revolved by a cable extending around the base, as described below, or by a gear mechanism connecting with the gear teeth $11^a$.

Instead of floating the base in water, it may be mounted on rollers and turned by the following gear mechanism: A pinion 16, is fixed to a vertical shaft 17, which is held in a suitable support 18, and the pinion meshes with the gear teeth $11^a$ of the base. The shaft 17 carries a driving pulley 19, which is revolved by a belt 20, and it will thus be seen that the movement of the shaft will be transmitted to the stand. This mechanism is shown clearly in Figs. 2 and 3, and in this case the grand stand revolves on rollers 21, which turn in a circular way 22, and on ways or rails 23, beneath the base 11, the track being braced by rods $22^a$, extending inward to a central ring $22^b$, and these rods $22^a$ form the axles for the rollers 21. The above construction is common to turntables and forms no part of my invention. In connection with this revolving mechanism a post 15 is used to fix the position of the base upon the rollers, the post having its upper end stepped in a cap $15^a$.

When a cable 24 is used, as shown in Figs. 2 and 3, it is passed around the base 11 and over a suitable driving pulley 25, mounted on a shaft 26, which turns in a support 27, and is provided with a driving wheel or pulley 28, carrying a belt 29. It will thus be seen that the movement of the shaft 26 will be transmitted to the grand stand, and it will be understood that either of the revolving mechanisms described may be timed so as to revolve the stand at the correct speed.

It will be understood that many other schemes might be introduced for revolving the stand, and I therefore do not limit myself to any particular means for producing the revolution of the stand.

As above remarked, the stand is preferably inside of the track, and in order that the people may reach the stand without interfering with the progress of the race, a tunnel may be made beneath the track or a bridge over it.

Having thus described my invention, I claim as new, and desire to secure by Letters Patent:—

1. A grand stand, comprising a basin-like base mounted to revolve on a central post and supporting the usual superstructure, and means engaging the rim of the base to revolve the same, substantially as described.

2. A grand stand, comprising a base having an upwardly projecting flange at its rim and supporting the usual superstructure, the said base being mounted to turn on a post, gear teeth on the flange of the base, and a vertical shaft mounted in suitable support adjacent to the flange of the base and provided with a pinion meshing with the teeth thereof, substantially as described.

3. A grand-stand comprising a reservoir, a revoluble base held to float in the reservoir, and the usual superstructure carried on the base, substantially as shown and described.

PASCAL P. CUPLIN.

Witnesses:
M. G. COLEMAN,
FRANK SEANER.